No. 44,143. PATENTED SEPT. 6, 1864.
J. S. LIPPS.
MANUFACTURE OF FULMINATING POWDER.

Witnesses:
J. W. Coombs
Henry Morris

Inventor:
Jean Stephan Lipps

UNITED STATES PATENT OFFICE.

JEAN STEPHAN LIPPS, OF BROOKLYN, NEW YORK, ASSIGNOR TO RICHARD REICHEL, OF SAME PLACE.

IMPROVEMENT IN THE MANUFACTURE OF FULMINATING-POWDER.

Specification forming part of Letters Patent No. 44,143, dated September 6, 1864; antedated September 2, 1864.

*To all whom it may concern:*

Be it known that I, JEAN STEPHAN LIPPS, of Brooklyn, in the county of Kings and State of New York, have invented a new and useful Improvement in the Manufacture of Fulminating-Powder; and I do hereby declare that the following is a full, clear, and exact description of the same, reference being had to the accompanying drawings, forming a part of this specification, in which—

Figure 1:
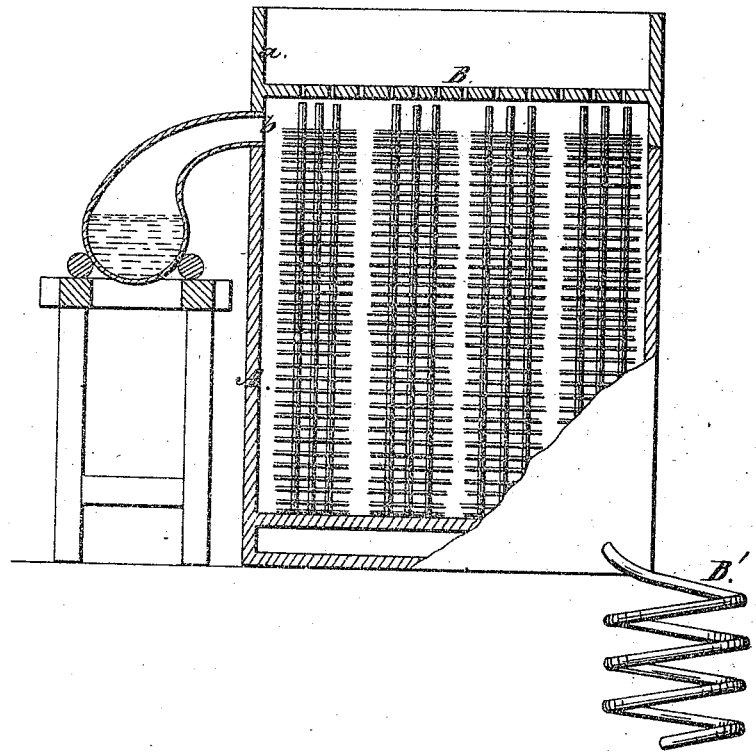
Figure 2:
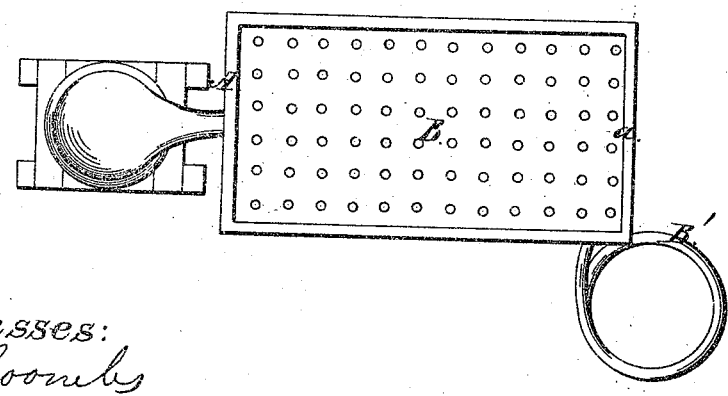

Figure 1 represents a longitudinal vertical section of my invention. Fig. 2 is a plan or top view of the same.

Similar letters of reference in both views indicate corresponding parts.

The object of this invention is to utilize the secondary products formed in the manufacture of fulminating-powder, and usually allowed to escape in the form of vapors, to the great detriment of the health of the operators and persons living in the neighborhood of the works.

The invention consists in the employment or use of a box filled with straw, brush-wood, or other suitable material, and provided with a perforated top, in combination with the retort or vessel containing the alcohol, nitric acid, and mercury used in the manufacture of fulminating powder, in such a manner that the vapors emanating from said retort or vessel can be brought in contact with water or with an alkaline solution divided over a large surface, and thereby condensed without producing any sensible increase of pressure, and consequently without danger of causing an explosion of the fulminating-powder.

To enable those skilled in the art to fully understand and construct my invention, I will proceed to describe it.

A represents a box, made of wood or any other suitable material, square, oblong, or in any other desired form and shape. This box is filled with straw, brush-wood, or other similar material, arranged crosswise in layers from the top to bottom and throughout its interior, and its top B is perforated and surrounded by a projecting rim, $a$, thus forming a tank on the top of the box through which water or other liquid can be introduced into the box A in a fine spray. An opening, $b$, on one side or end of the box, admits the neck of the retort which contains the mixture of alcohol, nitric acid, and mercury, used in the manufacture of fulminating-powder, or in factories where the quantity of powder to be manufactured exceeds the capacity of ordinary retorts, said mixture is placed in one or more vessels which are inclosed in a box provided with an aperture, which forms a communication with the box A, containing the straw or other material. The vapors emanating from the retort or vessel containing the fulminating mixture are principally composed of nitrous ether, which boils at a temperature of 61.5°, but which, when deprived of its acid, forms alcohol, and in this form condenses readily at an ordinary temperature. In order to effect this condensation, therefore, said vapors, on passing into the box A, are brought in contact with a spray of alkaline solution finely divided by the straw or brush wood, and the potash or other alkali readily absorbs the nitrous acid contained in the ether and forms nitride of potash, and the remaining alcohol readily condenses and runs off, together with the potash, through a worm, B', emanating from the bottom of the box A. The condensation of the vapors is thus effected without causing any sensible increase of pressure in the box A and in the retort, and consequently without danger of causing an explosion, and the condensed liquid, containing alcohol and nitride of potash, can be readily separated. The alcohol can be further used in the manufacture of the fulminating-powder or for other purposes, and the nitride of potash can be easily converted into nitrate of potash, and used in the manufacture of gunpowder or for any other desirable purpose.

This apparatus is very simple in its construction, its operation is attended with no danger, and by its use the vapors arising in the manufacture of fulminating-powder can be easily condensed and utilized.

What I claim as new, and desire to secure by Letters Patent, is—

The employment or use of a box, A, or its equivalent, filled with straw or other similar material, and provided with a perforated top, B, or its equivalent, in combination with a retort or vessel containing the ingredients necessary in the manufacture of fulminating-powder, substantially as and for the purpose shown and described.

JEAN STEPHAN LIPPS.

Witnesses:
M. M. LIVINGSTON,
J. W. COOMBS.